US009779720B2

(12) United States Patent
Lee et al.

(10) Patent No.: US 9,779,720 B2
(45) Date of Patent: Oct. 3, 2017

(54) CONTROL SYSTEM HAVING ACTIVE NOISE AND VIBRATION CENTRALIZED CONTROL THROUGH DIGITAL NETWORK

(71) Applicant: Ford Global Technologies, LLC, Dearborn, MI (US)

(72) Inventors: Ming-Ran Lee, Troy, MI (US); Ming-te Cheng, Ann Arbor, MI (US); Ramasunder Krishnaswami, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 14/681,426

(22) Filed: Apr. 8, 2015

(65) Prior Publication Data

US 2016/0300559 A1 Oct. 13, 2016

(51) Int. Cl.
*H04B 1/00* (2006.01)
*G10K 11/178* (2006.01)

(52) U.S. Cl.
CPC .... *G10K 11/1788* (2013.01); *G10K 2210/129* (2013.01); *G10K 2210/1282* (2013.01); *G10K 2210/3214* (2013.01)

(58) Field of Classification Search
CPC ................ H04R 2499/13; H04R 3/002; G10K 2210/1282; G10K 11/178; G10K 15/02; G10K 11/175
USPC ................................................... 381/71.2, 86
See application file for complete search history.

(56) References Cited

U.S. PATENT DOCUMENTS

| | | | | |
|---|---|---|---|---|
| 5,434,783 | A | 7/1995 | Pal et al. | |
| 7,231,052 | B2 | 6/2007 | Matsuoka et al. | |
| 7,876,910 | B2 | 1/2011 | Sakamoto et al. | |
| 8,296,103 | B2 | 10/2012 | Son et al. | |
| 2006/0061744 | A1 * | 3/2006 | Mensler ................ | F16F 15/005 355/53 |
| 2007/0192020 | A1 * | 8/2007 | Brulle-Drews .... | G01C 21/3647 701/532 |

(Continued)

FOREIGN PATENT DOCUMENTS

| | | | |
|---|---|---|---|
| JP | 7036468 | A | 2/1995 |
| JP | 2006213297 | A | 8/2006 |

OTHER PUBLICATIONS

Society of Autmotive Engineers of Japan, Inc., 240 Landmarks of Japanese Automotive Technology—Active vibration noise control systems for variable displacement engines, Landmarks of Japanese Automotive Technology, 2003.

*Primary Examiner* — Alexander Jamal
(74) *Attorney, Agent, or Firm* — Frank A. MacKenzie; Brooks Kushman P.C.

(57) ABSTRACT

A control system provides centralized active noise control (ANC) and active vibration control (AVC) through a digital network. The control system includes a controller, an audio sub-system, and a vibration sub-system. The audio-sub system includes at least one sound monitoring component and at least one sound outputting component. The vibration sub-system includes at least one vibration monitoring component and at least one vibration actuating component. The controller and the sub-systems are interconnected through the digital network. The controller controls the sub-systems through the digital network to perform the ANC and AVC functions in a holistic approach.

17 Claims, 3 Drawing Sheets

(56) References Cited

U.S. PATENT DOCUMENTS

| | | | | |
|---|---|---|---|---|
| 2012/0076319 | A1* | 3/2012 | Terwal | G06F 17/3074 381/86 |
| 2015/0100221 | A1* | 4/2015 | Routledge | F02D 17/02 701/111 |

* cited by examiner

CONTROL SYSTEM HAVING ACTIVE NOISE AND VIBRATION CENTRALIZED CONTROL THROUGH DIGITAL NETWORK

TECHNICAL FIELD

The present disclosure relates to vehicular active noise and vibration control systems.

BACKGROUND

An active noise control (ANC) system cancels noise. The ANC system monitors noise such as with the use of a microphone and outputs a noise cancelling sound such as with the use of a speaker. The noise cancelling sound is intended to be opposite in phase and same amplitude in comparison with the noise whereby the noise cancelling sound cancels the noise.

An active vibration control (AVC) system cancels vibrations. The AVC system monitors vibrations such as with the use of a vibration sensor and outputs cancelling forces such as with the use of a vibration actuator. The cancelling forces are intended to be opposite in phase and same amplitude in comparison with forces imposed by the vibrations whereby the cancelling forces cancel the vibrations. In sum, the principle of AVC is to create force based on vibration sensor feedback to neutralize the vibration.

An active sound control (ASC) system outputs sound effects to enhance specific spatial and temporal characteristics of a sound as opposed to attempting to cancel the sound. The ASC system outputs the sound effects such as with the use of a speaker.

SUMMARY

A system includes a controller, an audio sub-system, a vibration sub-system, and a digital network interconnecting the controller and the sub-systems. Through the digital network the controller controls the sub-systems to perform active noise control (ANC) and active vibration control (AVC) functions.

The audio sub-system may include a microphone for detecting noise and a speaker for outputting a noise cancelling sound. The microphone and the speaker are individually connected to the digital network in a daisy chain arrangement to be in communication with the controller. The controller through the digital network controls the speaker to output a noise cancelling sound corresponding to noise detected by the microphone in order to cancel the noise.

The vibration sub-system may include a vibration sensor for detecting vibrations and a vibration actuator for generating forces. The vibration sensor and the vibration actuator are individually connected to the digital network in the daisy chain arrangement to be in communication with the controller. The controller through the digital network controls the vibration actuator to generate a cancelling force corresponding to a force imposed by a vibration detected by the vibration sensor in order to cancel the vibration detected by the vibration sensor.

The digital network may be a single loop, twisted-wire pair capable of distributing audio and control data together with clock and power.

The audio sub-system may include a microphone configured to detect noise and a speaker configured to output a noise cancelling sound and the vibration sub-system may include a vibration actuator configured to generate forces. The controller through the digital network controls, based on noise detected by the microphone, the speaker to output a noise cancelling sound and the vibration actuator to generate a force causing a noise cancelling sound to be generated.

The audio sub-system may include a microphone configured to detect noise and a plurality of speakers each configured to output a noise cancelling sound. The controller through the digital network controls a subset of the speakers to output noise cancelling sounds based on noise detected by the microphone. The vibration sub-system may include a plurality of vibration actuators each configured to generate forces. In this case, the controller through the digital network controls, based on noise detected by the microphone, a subset of the speakers to output noise cancelling sounds and a subset of the vibration actuators to generate forces causing noise cancelling sounds to be generated.

The audio sub-system may include a speaker configured to output a noise cancelling sound and the vibration sub-system may include a vibration sensor configured to detect vibrations and a vibration actuator configured to generate forces. The controller through the digital network controls, based on vibrations detected by the vibration sensor, the vibration actuator to generate a cancelling force and the speaker to output a noise cancelling sound.

The vibration sub-system may include a vibration sensor configured to detect vibrations and a plurality of vibration actuators each configured to generate forces. The controller through the digital network controls a subset of the vibration actuators to generate cancelling forces based on vibrations detected by the vibration sensor. The audio sub-system may include a plurality of speakers each configured to output a noise cancelling sound. In this case, the controller through the digital network controls, based on vibrations detected by the vibration sensor, a subset of vibration actuators to generate cancelling forces and a subset of the speakers to output noise cancelling sounds.

The audio sub-system may include interior speakers for outputting noise cancelling sounds to counteract cabin noise, an air induction system speaker for outputting a noise cancelling sound to counteract air induction system orifice noise, and an exhaust system speaker for outputting a noise cancelling sound to counteract exhaust system tail pipe orifice noise and the vibration sub-system may include vibration actuators for generating forces. In this case, the controller controls the speakers and the vibration actuators in combination for air induction system and exhaust system ANC functions.

A vehicle includes a digital network and a control system including a controller, an audio sub-system, and a vibration sub-system interconnected through the digital network. Through the digital network the controller controls the sub-systems to perform active noise control (ANC) and active vibration control (AVC) functions. The vehicle may further include a controller area network (CAN) bus and a powertrain control unit. In this case, the controller is connected via the CAN bus to the powertrain control unit to receive vehicle related information for use by the controller in performing the ANC and AVC functions.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
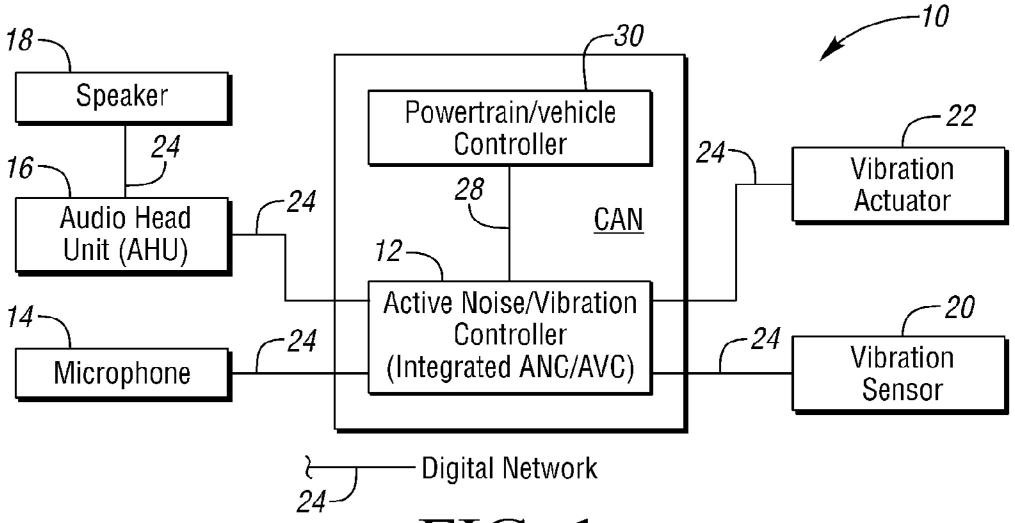
FIG. 1 illustrates a block diagram of a control system having active noise and vibration centralized control through a digital network.

FIG. 1 illustrates a block diagram of a control system 10 having active noise and vibration centralized control through a digital network 24. Control system 10 includes an active noise and vibration controller 12. Controller 12 is an integrated active noise control (ANC) and an active vibration control (AVC) controller. As such, controller 12 is an integrated ANC/AVC controller. Controller 12 is configured to perform ANC functions to cancel noise and AVC functions to cancel vibrations. Controller 12 may further be configured to perform active sound control (ASC) functions.

Control system 10 further includes an audio sub-system for controller 12 to perform ANC (and ASC) functions. The audio sub-system includes at least one microphone 14. Microphone 14 is configured to detect sound heard in an environment. Undesired sound is noise. As such, microphone 14 is configured to detect noise. The audio sub-system further includes an audio head unit (AHU) 16 and at least one speaker 18. AHU 16 is configured to generate an audio drive signal to drive speaker 18. Speaker 18 is configured to output a sound based on the audio drive signal.

Controller 12 performs an ANC function to cancel noise in an environment. For the ANC function, speaker 18 outputs sound which cancels noise detected by microphone 14. The output sound from speaker 18 is a noise cancelling sound opposite in phase and same amplitude in comparison with the noise detected by microphone 14. Accordingly, the noise cancelling sound cancels the noise.

Control system 10 further includes a vibration sub-system for controller 12 to perform AVC functions. The vibration sub-system includes at least one vibration sensor 20 and at least one vibration actuator 22. Vibration sensor 20 is configured to detect vibrations of a device or vibrations caused by the device. The device vibrates as a result of its operation and/or operation of other vibrating elements in mechanical communication with the device. The device vibrating may generate noise in an environment as a result of the vibrations being transmitted to the environment. Vibration actuator 22 is configured to generate forces. For instance, vibration actuator 22 is configured to generate a cancelling force in comparison with the force imposed by vibrations from the device vibrating whereby the cancelling force cancel the vibrations.

Controller 12 performs an AVC function to cancel the vibrations of the device and thereby cancel noise which would otherwise be generated due to the vibrations of the device. For the AVC function, vibration actuator 22 generates forces which counteract forces from the vibrations of the device as detected by vibration sensor 20. For instance, the device is an engine. Vibration sensor 20 detects vibrations of the engine caused by engine operation. Vibration actuator 22 generates a force to cancel the engine vibrations caused by engine operation. The forces generated by vibration actuator 22 are cancelling forces opposite in phase and same amplitude in comparison with forces imposed by the engine vibrations caused by engine operation. Cancelling the forces imposed by the engine vibrations caused by engine operation thereby cancels noise which would otherwise result from the engine vibrations.

Controller 12, the audio sub-system including microphone 14, AHU 16, and speaker 18, and the vibration sub-system including vibration sensor 20 and vibration actuator 22 are all in communication with one another via digital network 24. Controller 12 communicates via digital network 24 with the audio sub-system and the vibration sub-system to perform ANC and AVC functions. For instance, controller 12 communicates with microphone 14 to monitor noise heard in an environment and communicates with speaker 18 via AHU 16 to output a noise cancelling sound into the environment for cancelling the noise in the environment. Controller 12 communicates with vibration sensor 20 to monitor vibrations in an environment and communicates with vibration actuator 22 to output counteracting forces for cancelling the vibrations in the environment.

Digital network 24 is capable of distributing audio and control data together with clock and power over a single, unshielded twisted-pair wire. Thus, as a result of digital network 24 interconnecting controller 12 and the audio and vibration sub-systems with one another, the controller may perform "integrated" ANC/AVC functions. Controller 12 is thus an integrated ANC/AVC controller and therefore may use monitoring aspects of the audio and/or vibration sub-systems and outputting aspects of the audio and/or vibration sub-systems in conjunction with one another.

In regards to using monitoring aspects of the vibration sub-system with outputting aspects of the audio sub-system, controller 12 may monitor vibrations via the vibration sub-system in conjunction with outputting a noise cancelling sound via the audio sub-system. As an example, controller 12 communicates with vibration sensor 20 to monitor vibrations which cause noise in an environment. Instead of controlling vibration actuator 22 to generate counteracting forces to nullify the monitored vibrations, controller 12 controls speaker 18 to output a noise cancelling sound into the environment which cancels the noise.

In regards to using monitoring aspects of the audio sub-system with outputting aspects of the vibration sub-system, controller 12 may monitor noise via the audio sub-system in conjunction with outputting forces via the vibration sub-system. Controller 12 controls the vibration sub-system to output forces which cause a noise cancelling sound to be generated cancelling the noise. As an example, controller 12 controls microphone 14 to monitor noise heard in an environment. Instead of communicating with speaker 18 to output noise cancelling sound into the environment, controller 12 controls vibration actuator 22 to output a force which vibrates a device such that the device vibration causes a noise cancelling sound to be generated into the environment which cancels the noise.

The capability of integrated ANC/AVC controller 12 to use monitoring aspects of the audio and/or vibration sub-systems in conjunction with vibration aspects of the other one of the audio and vibration sub-systems enables control system 10 to have a "holistic" approach in active noise/vibration control. As such, controller 12 is enabled to provide an optimum solution in cancelling noise or vibration. Controller 12 is not constrained to cancel noise with a noise cancelling sound or to cancel undesired vibrations with counteracting forces. Instead, controller 12 can cancel noise with a weighted combination of noise cancelling sound and counteracting forces, where the weighting can range from just the noise cancelling sound to just the counteracting forces and any combination therebetween. Similarly, controller 12 can cancel undesired vibrations (or the noise induced by the undesired vibrations) with a weighted combination of noise cancelling sound and counteracting forces, where again the weighting can range anywhere between just the noise cancelling sound and just the counteracting forces.

The holistic approach of controller 12 is not limited to using just one monitoring component (e.g., microphone 14 or vibration sensor 20) in conjunction with just one outputting component (e.g., speaker 18 or vibration actuator 22). Instead, controller 12 may use one or more monitoring components (e.g., microphone 14 and/or vibration sensor 20) in conjunction with one or more outputting components (e.g., speaker 18 and/or vibration actuator 22). For instance, controller 12 may use microphone 14 to detect noise in an environment and use both of speaker 18 and vibration actuator 22 to cancel the noise. In this regard, controller 12 selects the noise cancelling sound from speaker 18 and the vibration actuation output from vibration actuator 22 which summate together to cancel the noise. Similarly, controller 12 may use vibration sensor 20 to detect vibrations in an environment and use both of speaker 18 and vibration actuator 22 to cancel noise caused by the vibrations in the environment. In this regard, controller 12 selects the noise cancelling sound from speaker 18 and the vibration actuation output from vibration actuator 22 which summate together to cancel the noise caused by the vibrations in the environment.

Figure 4:
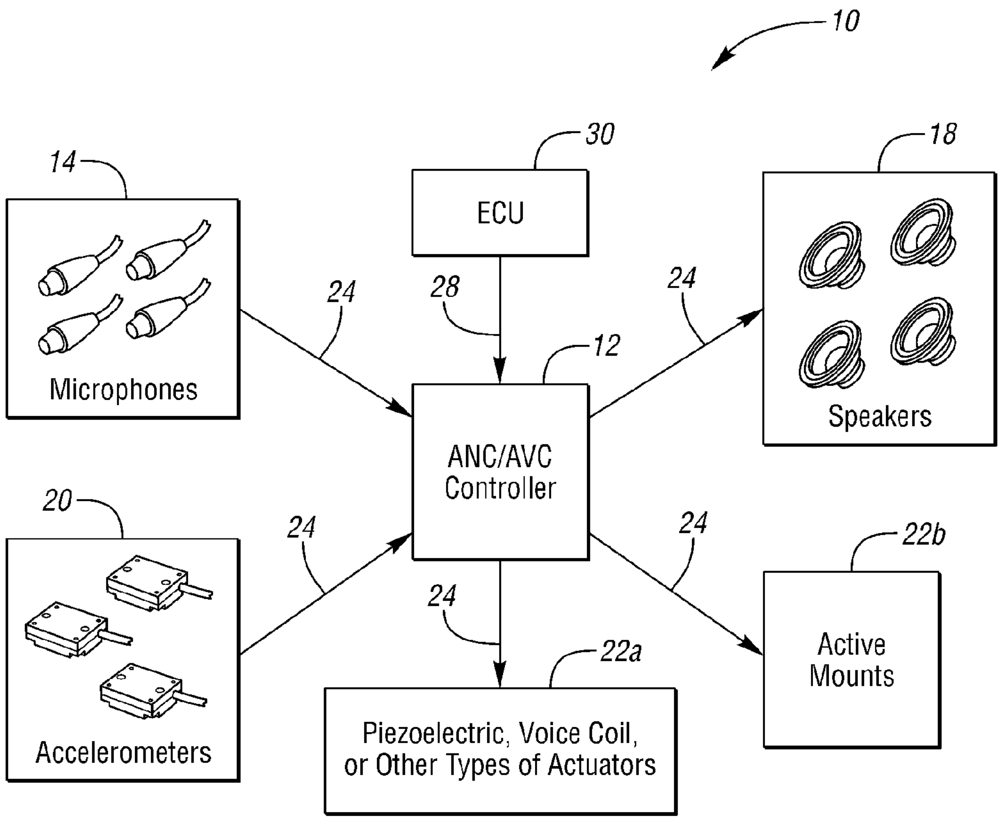
FIG. 4 illustrates a block diagram of the control system illustrating in greater detail additional aspects of the control system.

As shown best in FIG. 4, the audio sub-system of control system 10 may include a set of multiple microphones 14 and a set of multiple speakers 18 and the vibration sub-system of the control system may include a set of multiple vibration sensors 20 (such as a set of accelerometers) and a set vibration actuators 22 (such as a set of piezoelectric, voice coil, or other actuators 22*a* and a set of active mounts 22*b*). The holistic approach of controller 12 enables the controller to use any combination of the monitoring components (e.g., one or more or all of microphones 14 only, one or more of all of microphones 14 and one or more or all of vibration sensors 20, one or more or all of vibration sensors 20 only, etc.) in conjunction with any combination of the outputting components (e.g., one or more or all of speakers 18 only, one or more of all of speakers 18 and one or more of all of vibration actuators 22, one or more or all of vibration actuators 22 only, etc.). Pursuant to the holistic approach, controller 12 receives sensor signals from all of microphones 14 and vibration sensors 20 and holistically optimizes the control output for individual speaker/vibration actuator.

The audio sub-system may be understood as including multiple audio sub-subsystems, each including one or more microphones 14 and one or more speakers 18. For instance, the audio sub-subsystems may be an interior audio sub-subsystem and an exterior audio sub-subsystem. For example, the interior audio sub-subsystem includes multiple microphones 14 and multiple speakers 18. The exterior audio sub-subsystem includes a single microphone 14 with a single speaker 18 for tailpipe and/or a single microphone 14 with single speaker 18 for air inlet.

Likewise, the vibration sub-system may be understood as including multiple vibration sub-subsystems, each including one or more vibration sensors 20 and one or more of vibration actuators 22. For instance, the vibration systems include a plurality of active mount vibration sub-subsystems. For example, each active mount vibration sub-subsystem includes a single vibration sensor 20 with a single vibration actuator 22 for each mount and/or multiple vibration actuators 22 at different panel locations (e.g., roof/lift gate) with multiple vibration sensors 20.

Figure 2:
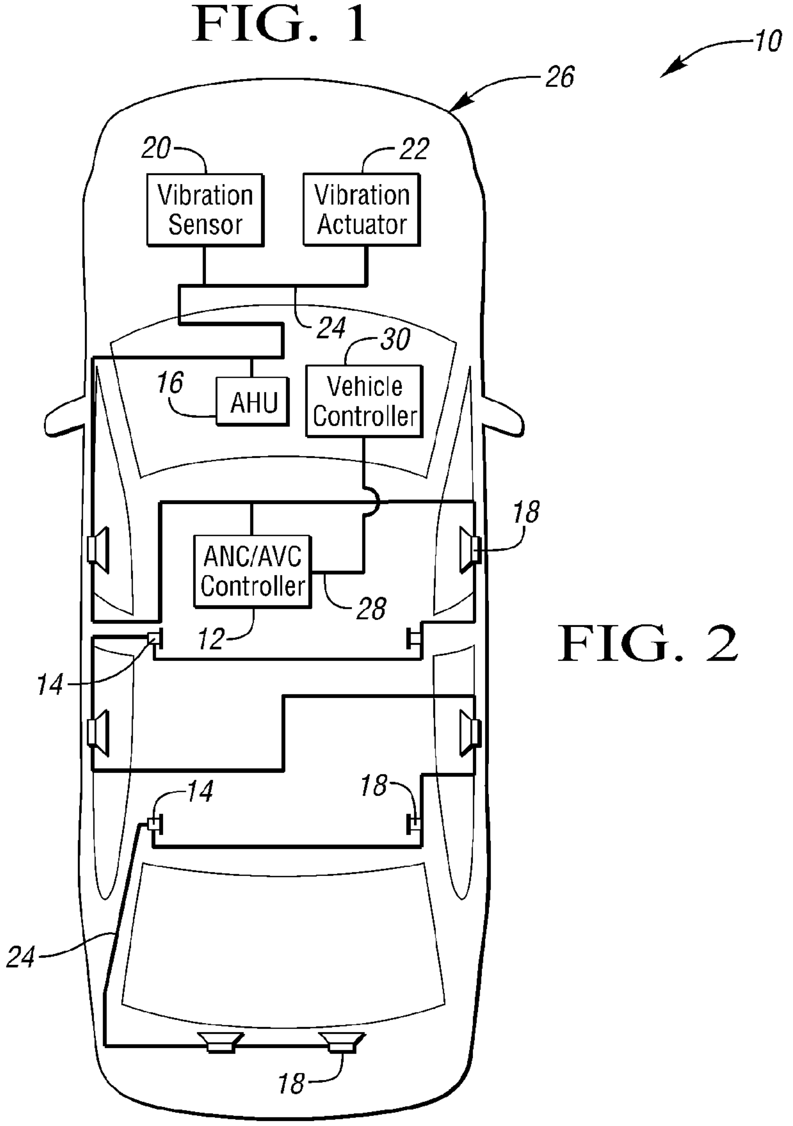
FIG. 2 illustrates a block diagram of the control system implemented in a vehicle.

Referring now to FIG. 2, with continual reference to FIGS. 1 and 4, a block diagram of control system 10 implemented in a vehicle 26 is shown. As noted above, digital network 24 includes a single, unshielded twisted-pair wire capable of distributing audio and control data together with clock and power. Digital network 24 runs through vehicle 26 in a full, single loop as indicated in FIG. 2. Controller 12, microphones 14, AHU 16, and speakers 18 of the audio sub-system, and vibration sensors 20 (only one shown in FIG. 2) and vibration actuators 22 (only one shown in FIG. 2) of the vibration sub-system are all connected to digital network 24 in a daisy chain arrangement.

In the vehicle implementation, controller 12 is further configured to communicate via a controller area network (CAN) bus 28 with other vehicle devices such as controllers, sensors, and the like. In this way, control system 10 incorporates both of a digital network and a CAN bus. For instance, as shown in FIGS. 1, 2, and 4, controller 12 can communicate with a vehicle controller (electronic control unit (ECU)) 30 via CAN bus 28. Controller 12 receives from vehicle controller 30 vehicle related information such as engine speed, engine torque, vehicle speed, etc. Controller 12 may use the vehicle related information to perform ANC/AVC (and ASC) functions. For example, controller 12 may generate a reference signal proportional to the frequency of engine rotation cycles in order to generate a noise cancelling sound.

Figure 3:
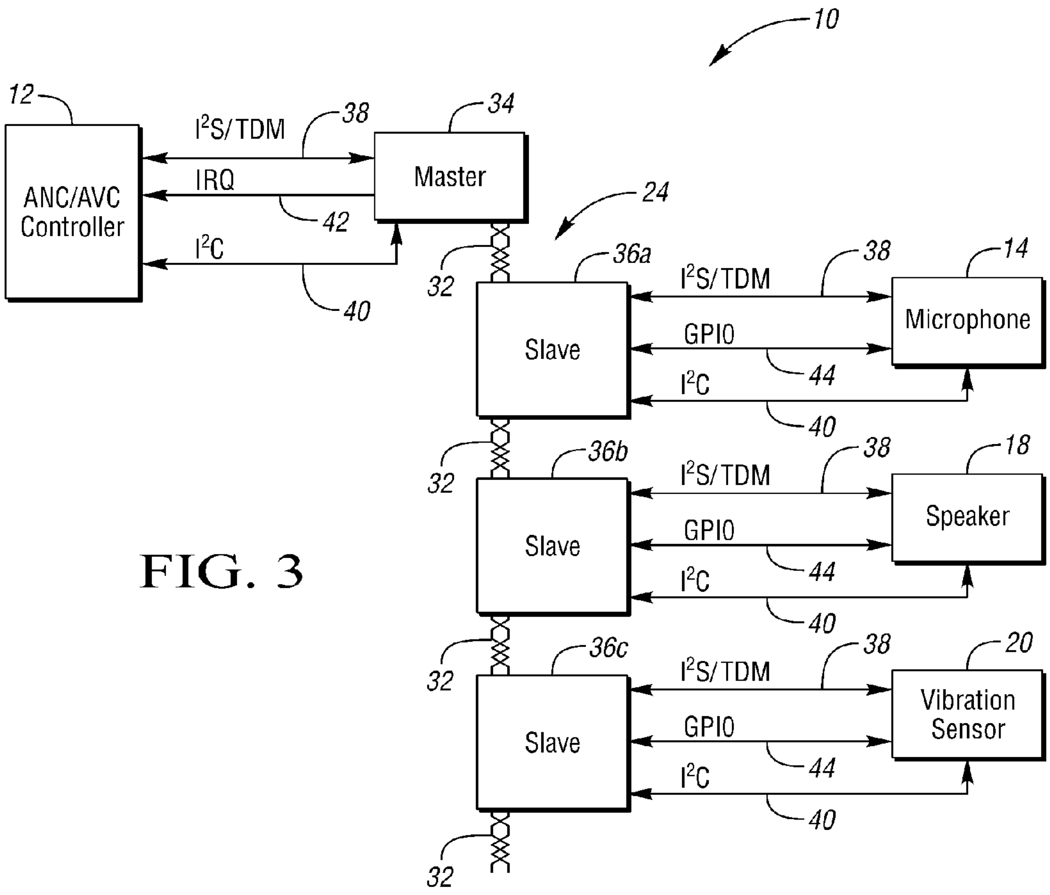
FIG. 3 illustrates a block diagram of the units of the control system interconnected through the digital network.

Referring now to FIG. 3, with continual reference to FIGS. 1, 2, and 4, a block diagram of the units of control system 10 interconnected through digital network 24 is shown. In the implementation shown in FIG. 3, digital network 24 is an Automotive Audio Bus (A2B)™ network (trademark by ANALOG DEVICES, INC. of Norwood, Mass.). Digital network 24 includes a single, unshielded twisted-pair wire 32, a master transceiver node 34, and slave transceiver nodes 36. Slave transceiver nodes 36 are daisy-chained by twisted-pair wire 32 to master transceiver node 34 in the manner illustrated in FIG. 3.

Controller 12 (i.e., the Digital Signal Processing (DSP) host controller) is connected to master transceiver node 34. The units of the audio sub-system and the vibration sub-system of control system 10 are individually connected to respective ones of slave transceiver nodes 36. For instance, microphone 14 is connected to a first slave transceiver node 36*a*, speaker 18 is connected to a second slave transceiver node 36*b*, and vibration sensor 20 is connected to a third slave transceiver node 36*c*. As such, the audio sub-system and vibration sub-system units are digital units configured for communication over digital network 24.

Digital network 24 embodied as an (A2B)™ network provides a bi-directional, multi-channel, $I^2S$/TDM (Integrated Interchip Sound/Time Division Multiplexing) link 38 over distances of up to ten meters between transceiver nodes 34 and 36. Digital network 24 embeds bi-directional synchronous data (digital audio and digital vibration), clock, and synchronization signals onto a single differential wire pair 32 (up to forty meters in overall length). Digital network 24 provides a direct point-to-point connection and allows multiple, daisy chained nodes at different locations to contribute or consume time division multiplexed channel content. Master transceiver node 34 generates clock, synchronization, and framing for slave transceiver nodes 36. Master transceiver node 34 is programmable via controller 12 over a control ($I^2C$) bus 40 for configuration and read back. An extension of control ($I^2C$) bus 40 is embedded in the data stream allowing direct access of registers and status information on slave transceiver nodes 36 as well as $I^2C$-to-$I^2C$ communication over distance.

As described and as illustrated in FIG. 3, digital network 24 is characterized as having transceiver nodes 34 and 36 individually connected together via a twisted-pair wire 32. Controller 12 communicates directly with master transceiver node 34 and the units of the audio and vibration sub-systems of control system 10 communicate directly with respective ones of slave transceiver nodes 36. Controller 12 communicates with master transceiver node 34 via $I^2S$/TDM link 38, $I^2C$ bus 40, and an interrupt request (IRQ) bus 42. The units of the audio and vibration sub-systems of control system 10 communicate with their corresponding slave transceiver nodes 36 via $I^2S$/TDM link 38, $I^2C$ bus 40, and a general purpose input/output bus 44.

With reference to all of FIGS. 1, 2, 3, and 4, as described, control system 10 provides ANC/AVC centralized control through digital network 24. The centralized noise control includes engine related noise cancellation, sound enhancement, and broadband noise cancellation of powertrain, road, and wind noise. The centralized vibration control includes improving powertrain vibration. As such, control system 10 provides an integrated total active noise, vibration, and harshness (NVH) control system solution.

Control system 10 includes controller 12, audio subsystem units including microphone 14 and speaker 18, and vibration sub-system units including vibration sensor 20 and vibration actuator 22 which are all interconnected via digital network 24. Digital network 24 is capable of distributing audio and control data together with clock and power of a single twisted-wire pair 32. Digital network 24 provides a relatively simple wiring solution which does not employ multiple wiring harnesses/connectors for connecting the units of control system 10 together.

Controller 12 is an integrated ANC/AVC controller which can be a separate module or a DSP/micro-chip residing in other control modules. Controller 12 includes both powertrain narrowband and broadband control algorithms and vibration control algorithms (e.g., FxLMS and Variable Bandwidth Delay-less Sub-band algorithm for Broadband Active Noise Control System). This control also includes engine sound enhancement algorithm and diagnostic function. Controller 12 receives CAN broadcasted data (engine speed, engine torque, vehicle speed, etc.) and reference signals from microphone 14 and vibration sensor 20 through digital network 24.

Controller 12 sends out noise cancellation signals to AHU 16 for mixing with music to drive speaker 18 through digital network 24. As such, microphone 14 is used for feedback signal for active noise control and speaker 18 is used as an actuator for active noise cancellation.

Controller 12 sends out vibration cancellation signals to vibration actuator 22 for vibration control. Vibration sensor 20 can be an accelerometer for vibration cancellation or broadband noise cancellation. Vibration sensor 20 can be an existing powertrain or chassis sensor such as a knock sensor of an anti-lock braking system (ABS) sensor. Vibration actuator 22 can be an active mount or active shaker depending on the solution requirement.

In sum, controller 12 receives mic/sensor inputs and controls multiple active devices such as interior speakers, exterior ANC speakers (air injection system (AIS)/exhaust), ACM, active vibration actuators, linear motors, etc. Controller 12 employs a holistic approach to manage reference signals from multiple mics/sensors and to individually optimize the actuators. Controller 12 uses CAN bus information to incorporate exiting engine sensors and operation status for additional feed-forward control inputs. As such, control system 10 is an optimal and low-cost ANC/AVC control system to manage and integrate various active control systems for achieving a desired NVH benefit.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system comprising:

a controller;

an audio sub-system including a microphone for detecting noise and a speaker for outputting a noise cancelling sound;

a vibration sub-system including a vibration sensor for detecting vibrations and a vibration actuator for generating forces;

a digital network interconnecting the controller and the sub-systems;

wherein the controller, the microphone, the speaker, the vibration sensor, and the vibration actuator are individually connected to the digital network in a daisy chain arrangement to be in communication with one another; and wherein the controller is configured to communicate with and control through the digital network the audio sub-system including the microphone and the speaker and the vibration sub-system including the vibration sensor and the vibration actuator to perform active noise control (ANC) and active vibration control (AVC) functions and the controller is further configured to control through the digital network, based on noise detected by the microphone, the speaker to output a noise cancelling sound and the vibration actuator to generate a force causing a noise cancelling sound to be generated; where the controller communicates with an electronic control unit via a CAN bus, so that the controller generates a reference signal proportional to the frequency of the engine rotation cycles.

2. The system of claim 1 wherein:

the controller is further configured to control through the digital network the speaker to output a noise cancelling sound corresponding to noise detected by the microphone in order to cancel the noise.

3. The system of claim 1 wherein:

the controller is further configured to control through the digital network the vibration actuator to generate a cancelling force corresponding to a force of a vibration detected by the vibration sensor in order to cancel the vibration detected by the vibration sensor.

4. The system of claim 1 wherein:

the digital network is a single loop, twisted-wire pair capable of distributing audio and control data together with clock and power.

5. The system of claim 1 wherein:

the controller is further configured to control through the digital network, based on noise detected by the microphone, the speaker to output a noise cancelling sound and the vibration actuator to generate a force causing a noise cancelling sound to be generated.

6. The system of claim 1 wherein:

the audio sub-system further includes additional speakers each configured to output a noise cancelling sound, the additional speakers being connected to the digital network in the daisy chain arrangement; and the controller is further configured to control through the digital network a subset of more than one of all of the speakers to output noise cancelling sounds based on noise detected by the microphone.

7. The system of claim 6 wherein:

the vibration sub-system further includes additional vibration actuators each configured to generate forces, the additional vibration actuators being connected to the digital network in the daisy chain arrangement; and the controller is further configured to control through the digital network, based on noise detected by the microphone, a subset of more than one of all of the speakers to output noise cancelling sounds and a subset of more than one of all of the vibration actuators to generate forces causing noise cancelling sounds to be generated.

8. The system of claim 1 wherein:

the controller is further configured to control through the digital network, based on vibrations detected by the vibration sensor, the vibration actuator to generate cancelling forces and the speaker to output a noise cancelling sound.

9. The system of claim 1 wherein:

the vibration sub-system further includes additional vibration actuators each configured to generate forces, the additional vibration actuators being connected to the digital network in the daisy chain arrangement; and the controller is further configured to control through the digital network a subset of more than one of all of the vibration actuators to generate cancelling forces based on forces of vibrations detected by the vibration sensor.

10. The system of claim 9 wherein:

the audio sub-system further includes additional speakers each configured to output a noise cancelling sound, the additional speakers being connected to the digital network in the daisy chain arrangement; and the controller is further configured to control through the digital network, based on vibrations detected by the vibration sensor, a subset of more than one of all of vibration actuators to generate cancelling forces and a subset of the speakers to output noise cancelling sounds.

11. The system of claim 1 wherein:

the audio sub-system further includes interior speakers for outputting noise cancelling sounds to counteract cabin noise, an air induction system speaker for outputting a noise cancelling sound to counteract air induction system orifice noise, and an exhaust system speaker for outputting a noise cancelling sound to counteract exhaust system tail pipe orifice noise, the interior speakers, the air induction speaker, and the exhaust system speaker being connected to the digital network in the daisy chain arrangement;

the vibration sub-system further includes additional vibration actuators for generating forces, the additional vibration actuators being connected to the digital network in the daisy chain arrangement; and wherein the controller is further configured to control through the digital network the speakers and the vibration actuators in combination for air induction system and exhaust system ANC functions.

12. A vehicle comprising:

a controller;

an audio sub-system including a microphone for detecting noise and a speaker for outputting a noise cancelling sound;

a vibration sub-system including a vibration sensor for detecting vibrations and a vibration actuator for generating forces;

a digital network;

wherein the controller, the microphone, the speaker, the vibration sensor, and the vibration actuator are individually connected to the digital network in a daisy chain arrangement to be in communication with one another; and wherein the controller is configured to communicate with and control through the digital network the audio sub-system including the microphone and the speaker and the vibration sub-system including the vibration sensor and the vibration actuator to perform active noise control (ANC) and active vibration control (AVC) functions for the vehicle and the controller is further configured to control through the digital network, based on noise detected by the microphone, the speaker to output a noise cancelling sound and the vibration actuator to generate a force causing a noise cancelling sound to be generated; where the controller communicates with an electronic control unit via a CAN bus, so that the controller generates a reference signal proportional to the frequency of the engine rotation cycles.

13. The vehicle of claim 12 further comprising:

a powertrain control unit;

wherein the controller is connected via the CAN bus to the powertrain control unit to receive vehicle related information for use by the controller in performing the ANC and AVC functions.

14. The vehicle of claim 13 wherein:

the controller is further configured to control through the digital network, based on noise detected by the microphone, the speaker to output a noise cancelling sound and the vibration actuator to generate noise inducing forces causing a noise cancelling sound to be generated.

15. The vehicle of claim 13 wherein:

the controller is further configured to control through the digital network the vibration actuator to generate vibration cancelling forces and the speaker to output a noise cancelling sound based on vibrations detected by the vibration sensor.

16. The vehicle of claim 12 wherein:

the audio sub-system further includes interior speakers for outputting noise cancelling sounds to counteract cabin noise, an air induction system speaker for outputting a noise cancelling sound to counteract air induction system orifice noise, and an exhaust system speaker for outputting a noise cancelling sound to counteract exhaust system tail pipe orifice noise, the interior speakers, the air induction speaker, and the exhaust system speaker being connected to the digital network in the daisy chain arrangement;

the vibration sub-system further includes additional vibration actuators for generating forces, the additional vibration actuators being connected to the digital network in the daisy chain arrangement; and wherein the controller is further configured to control through the digital network the speakers and the vibration actuators in combination for air induction system and exhaust system ANC functions.

17. A system comprising:

a digital network;

a controller, a microphone, a speaker, and a vibration actuator individually connected to the digital network in a daisy chain arrangement; and wherein the controller is configured to control through the digital network, based on noise detected by the microphone, the speaker to output a noise cancelling sound and the vibration actuator to generate a force causing a noise cancelling sound to be generated; where the controller communicates with an electronic control unit via a CAN bus, so that the controller generates a reference signal proportional to the frequency of the engine rotation cycles.

* * * * *